United States Patent
Barsacchi (10) Patent No.: US 8,353,662 B2
(45) Date of Patent: Jan. 15, 2013

(54) ROBOT FOR HANDLING ROLLS

(75) Inventor: Fernando Barsacchi, Lucca (IT)

(73) Assignee: A. Celli Nonwovens S.p.A., Lucca (IT)

( * ) Notice: Subject to any disclaimer, the term of this patent is extended or adjusted under 35 U.S.C. 154(b) by 610 days.

(21) Appl. No.: 12/373,567

(22) PCT Filed: Jun. 28, 2007

(86) PCT No.: PCT/IT2007/000460
§ 371 (c)(1), (2), (4) Date: Oct. 30, 2009

(87) PCT Pub. No.: WO2008/010251
PCT Pub. Date: Jan. 24, 2008

(65) Prior Publication Data
US 2010/0047050 A1   Feb. 25, 2010

(30) Foreign Application Priority Data

Jul. 17, 2006 (WO) .................. PCT/IT2006/000537

(51) Int. Cl.
*B66F 9/18* (2006.01)
(52) U.S. Cl. ........ 414/621; 414/627; 414/910; 414/730; 414/737; 414/741
(58) Field of Classification Search .................. 414/621, 414/627, 910, 911, 730, 737, 741
See application file for complete search history.

(56) References Cited

U.S. PATENT DOCUMENTS

| | | | |
|---|---|---|---|
| 3,758,144 A | 9/1973 | Dalglish | |
| 7,729,796 B2 * | 6/2010 | Hartrampf et al. | 700/175 |
| 2003/0132553 A1 * | 7/2003 | Wilsterman et al. | 264/407 |

FOREIGN PATENT DOCUMENTS

| | | |
|---|---|---|
| DE | 84 35 161 U1 | 5/1985 |
| EP | 0 747 308 A1 | 12/1996 |
| EP | 1 070 675 A2 | 1/2001 |
| EP | 1 157 952 A2 | 11/2001 |
| EP | 1 245 354 A1 | 10/2002 |
| EP | 1 245 515 A1 | 10/2002 |
| EP | 1 169 250 B1 | 11/2003 |
| EP | 1 375 400 A1 | 1/2004 |
| JP | 4-64595 | 2/1992 |
| JP | 8-157177 | 6/1996 |
| JP | 10-128634 | 5/1998 |
| WO | WO 00/61480 | 10/2000 |
| WO | WO 02/092483 A1 | 11/2002 |

* cited by examiner

*Primary Examiner* — Saul Rodriguez
*Assistant Examiner* — Willie Berry, Jr.
(74) *Attorney, Agent, or Firm* — McGlew and Tuttle, P.C.

(57) ABSTRACT

A robot for handling rolls of web material, is disclosed. The robot includes an articulated arm (60), moving according to a plurality of numerically controlled axes and supporting a suction head (61A).

18 Claims, 10 Drawing Sheets

ROBOT FOR HANDLING ROLLS

TECHNICAL FIELD

The present invention relates to a robot for handling rolls of web material, in particular although not exclusively rolls or reels of nonwoven.

PRIOR ART

Nonwoven is a material with many uses in various industrial fields. It is used, for example, as a component in the production of sanitary napkins, babies diapers and similar articles of manufacture. Nonwoven is also utilized to produce filters, garments particularly of the disposable type, sheets, sanitary articles of various types and other articles.

Nonwoven is usually produced continuously by a system or machine with a winder provided at the outlet thereof; the winder is a machine that continuously receives the strip of web material and winds it into reels with a large diameter, also called parent or master reels. These large reels must subsequently be unwound and rewound cutting the web material into strips of a smaller width to produce, in parallel, rolls of different diametrical and axial dimensions. The dimension of the rolls depends on the final destination of the semi-finished product. These rolls are then usually sent to other systems or plants to form the starting material for production of the finished article.

Machines to produce nonwoven can be carding machines and mechanical entangling or hydro entangling systems, spun lace systems or others known systems.

An example of a winder utilizable downstream of a machine for continuous production of a nonwoven is described in EP-A-1245515. In this particular type of winder the web material is wound around a winding axle or mandrel supported between two side panels. The reel being formed is held pressed against a winding roller around which the web material delivered from the production machine is fed.

Rewinders, which can have different conformations, are utilized to unwind the reel and rewind it into single rolls after having first divided it via longitudinal cutting into single strips. Purely by way of example, some rewinders utilizable in the production of nonwoven are described in EP-A-0747308, EP-A-1070675, EP-A-1375400.

The rewinder is equipped with a system of blades and counter-blades or other longitudinal cutting tools. These are positioned transversely with respect to the direction of feed of the web material, on the basis of the dimensions of the strips to be obtained by cutting the web material from the reel. Various systems have been studied for automatic positioning the blades as a function of the material to be produced. An example of device to perform said positioning is described in EP-A-1245354.

Winding mandrels, on which tubular winding cores, corresponding in number, position and dimension to the number, position and dimension of the strips into which the cutting tools divide the web material coming from the master reel being unwound, have been fitted, are inserted time by time in the rewinder. Machines and devices that prepare the mandrel with the tubular winding cores fitted thereon currently exist. An example of a device of this type is described in WO-A-0061480 and in the corresponding European patent EP-B-1169250.

Downstream of the rewinders the winding mandrels are removed from the formed rolls, which are then sent to packaging.

Once the mandrel has been removed from the set of rolls or reels obtained by simultaneously winding the strips of web material cut from the web unwound from the parent roll, said rolls must be handled for packaging purposes. Usually, these rolls are grouped according to their axial dimension and placed on pallets. Separating cardboard sheets are placed between adjacent rolls in order to avoid damage of the web material. Stacks of rolls are then wrapped in plastic film for shipment.

OBJECTS AND SUMMARY OF THE INVENTION

According to one aspect, the invention concerns a robot for handling rolls of web material, particularly although not exclusively rolls of tissue paper, nonwoven and the like.

In one embodiment, the robot according to the invention comprises an articulated arm, movable according to a plurality of numerically controlled axes and supporting a suction head. According to an embodiment, the suction head has a surface for gripping the rolls substantially flat in shape and approximately semi-circular. Advantageously, the suction head can have suction areas that can be activated selectively as a function of the diameter of the roll to be handled.

According to a preferred embodiment of the invention, the suction areas are formed of substantially semi-annular portions, in fluid connection with a suction duct. Also provided are selection members to selectively connect said substantially semi-annular portions to the suction duct. The selection members can comprise a valve.

In a further embodiment, the head of the robot can have a plurality of self-closing valves, connected to a suction duct and positioned with the suction side towards the gripping surface of the suction head of the robot. The self-closing valves can be equipped with respective shut-off members which close the valve when there is no surface of a roll to be engaged via said head in front of it.

In a particularly preferred embodiment of the invention, a sensor to activate suction when the head is in proximity to a roll is associated with said head.

Further preferred additional features and embodiments of the robot according to the invention are shown in the attached drawings and disclosed here below, and set forth in the dependent claims.

BRIEF DESCRIPTION OF THE DRAWINGS

The invention will be better understood by following the description and accompanying drawings, which show non-limiting practical embodiments of the invention.

More specifically, in the drawing.

DETAILED DESCRIPTION OF EMBODIMENTS OF THE INVENTION

Figure 1A:
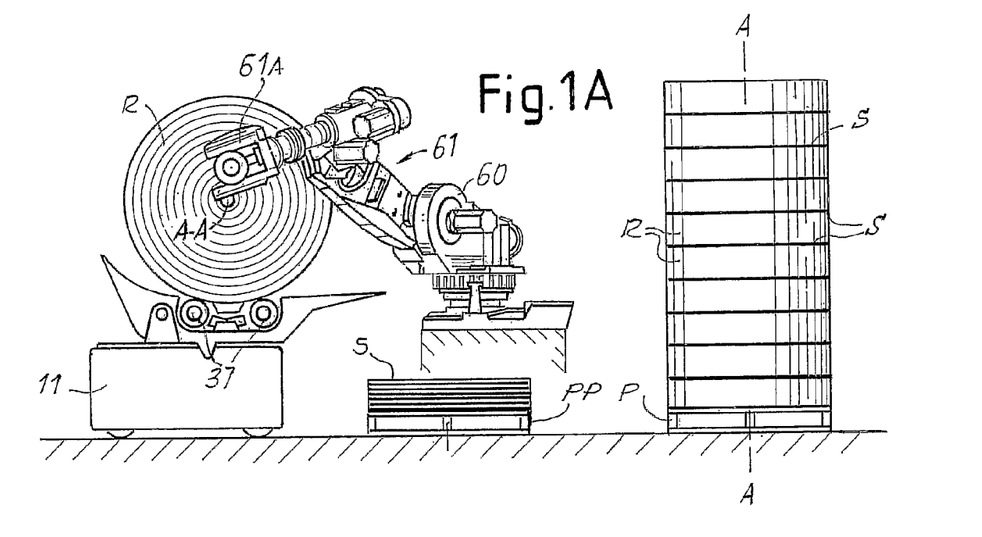
FIGS. 1A and 1B show a side view of a shuttle on which rolls of web material are placed, and details of operation of the robot provided for handling said rolls in a possible way of using said robot.
Figure 1B:
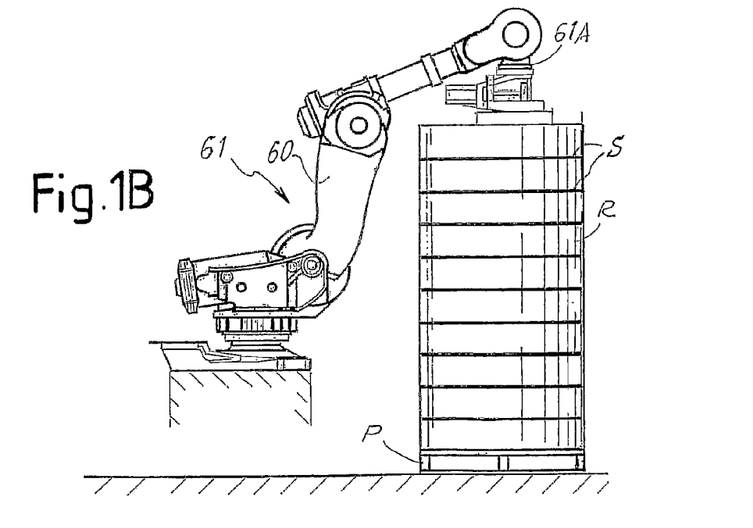

FIGS. 1A-1B schematically show a robot embodying the invention in a possible use thereof. The robot is indicated by 61 as a whole. The robot is comprised of a robot arm 60 movable according to a plurality of numerically controlled axes, and a suction head 61A for gripping and handling the rolls R.

In the application shown in FIGS. 1A, 1B the robot is designed and controlled to pick up single rolls or reels R which are positioned on a cradle formed by rollers 37 on a shuttle 11. The robot could be designed to pick up the reels directly from the rewinder, or from a cradle fixedly placed at the outlet of said rewinder, rather than from a movable shuttle as shown in FIGS. 1A, 1B.

The rolls R are positioned in the cradle 37, 37 with their axes A-A horizontal. The robot 61 can be arranged on sliding tracks (not shown) extending orthogonal to the figure, to allow the robot 61 to be positioned with the head 61A thereof each time at the level of the first roll of each group of rolls R positioned on the shuttle 11.

FIGS. 1A and 1B schematically illustrate the movement with which the robot 61, by means of the head 61A, positions itself to pick up the roll R from the row of rolls placed on the shuttle 11 (FIG. 1A) and, with a rotation of the head (FIG. 1B), places said roll on top of a stack of rolls R being formed on a pallet P or on a simple surface shaped to allow the reels to be picked up by a fork lift truck or any other suitable transportation device.

In a possible embodiment, a stack of separating sheets S of cardboard or the like is placed in a suitable position, which can be easily reached by the head 61A of robot 61. The separator sheets can be disk-shaped and can have a diameter equal to the diameter of the rolls R.

In the embodiment shown in FIG. 1A, the stack of separating sheets is placed on a pallet Pp. A different support could be used, such as a trolley, a shuttle or the like. In some cases separator sheets can be dispensed with, depending upon the nature of the web material wound on the rolls R.

Various embodiments of the robot head 61A and of the relevant gripping members provided thereon for gripping the rolls R and the separating sheets S are shown in FIGS. 2A-12, which will be described in more detail herein below.

Figure 2A:
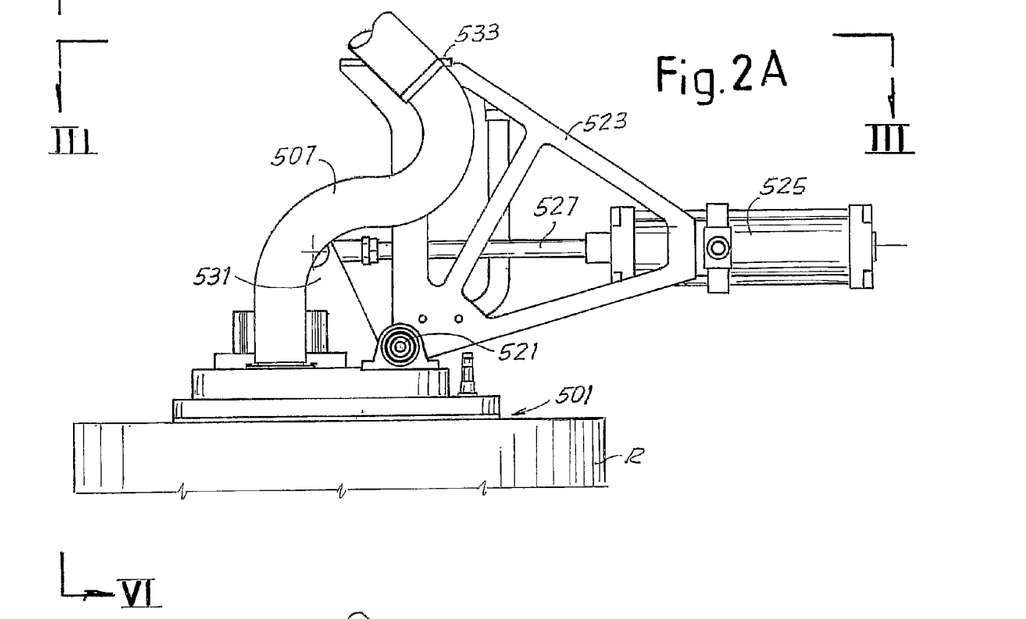
FIGS. 2A and 2B show the head of the robot in a side view and in two different angular positions in a first embodiment.
Figure 2B:
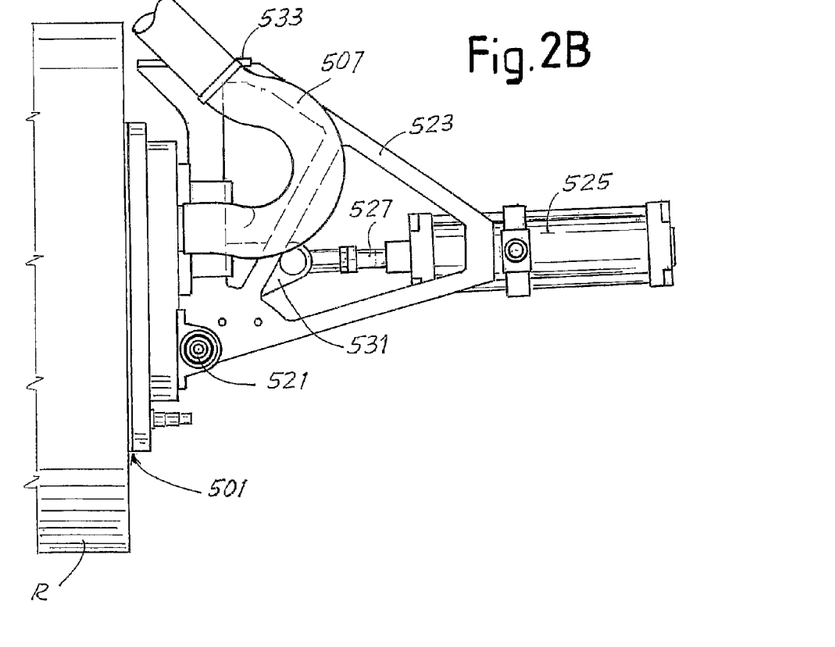
Figure 3:
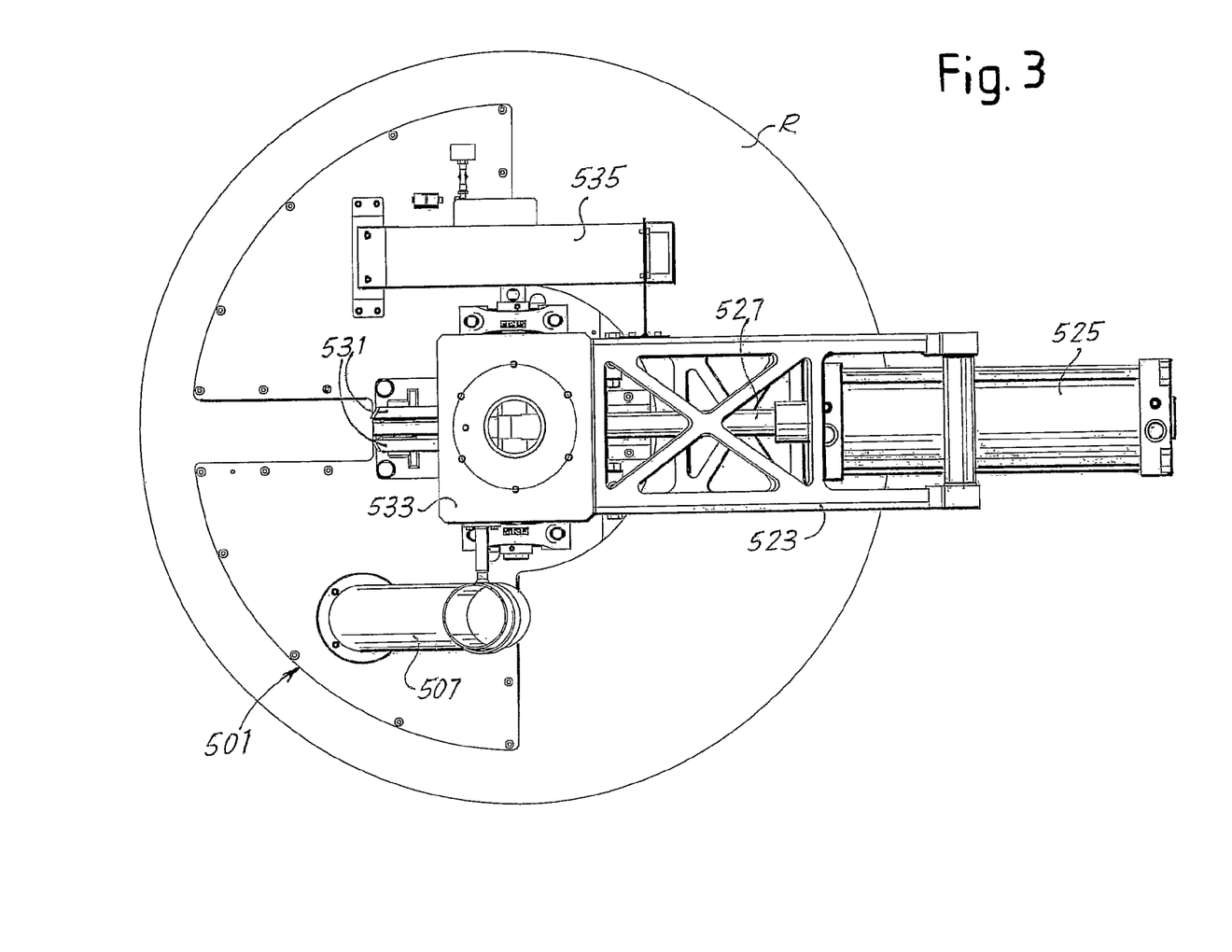
FIG. 3 shows a view according to III-III in FIG. 2A.
Figure 4:
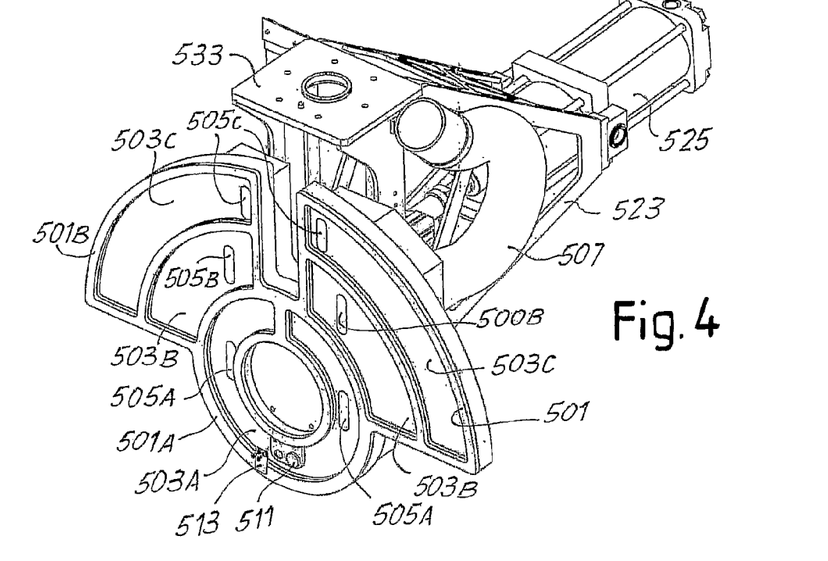
FIGS. 4 and 5 show axonometric views of the head in FIGS. 2A, 2B, 3 in two angular positions.
Figure 5:
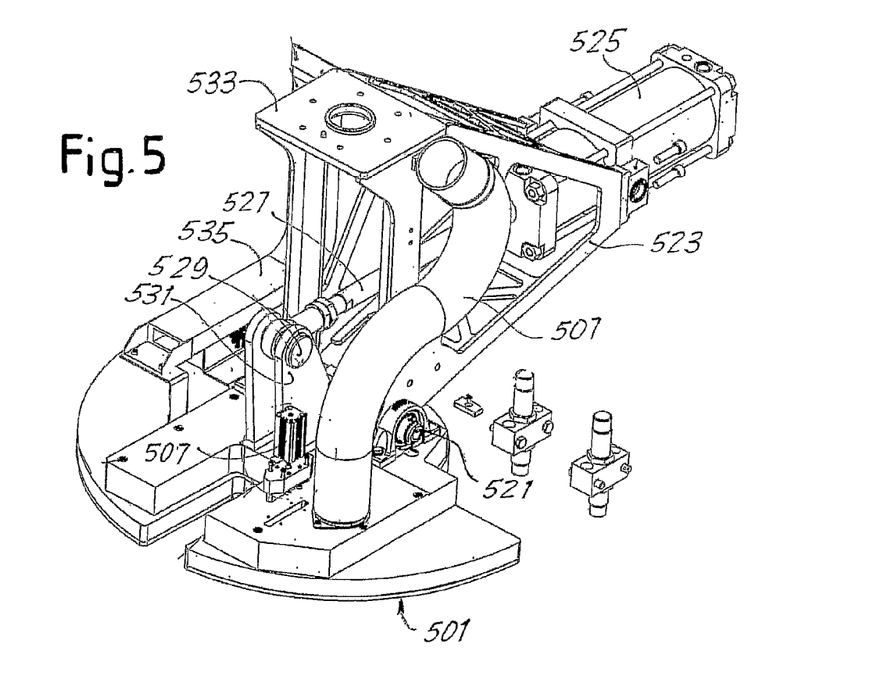
Figure 6:
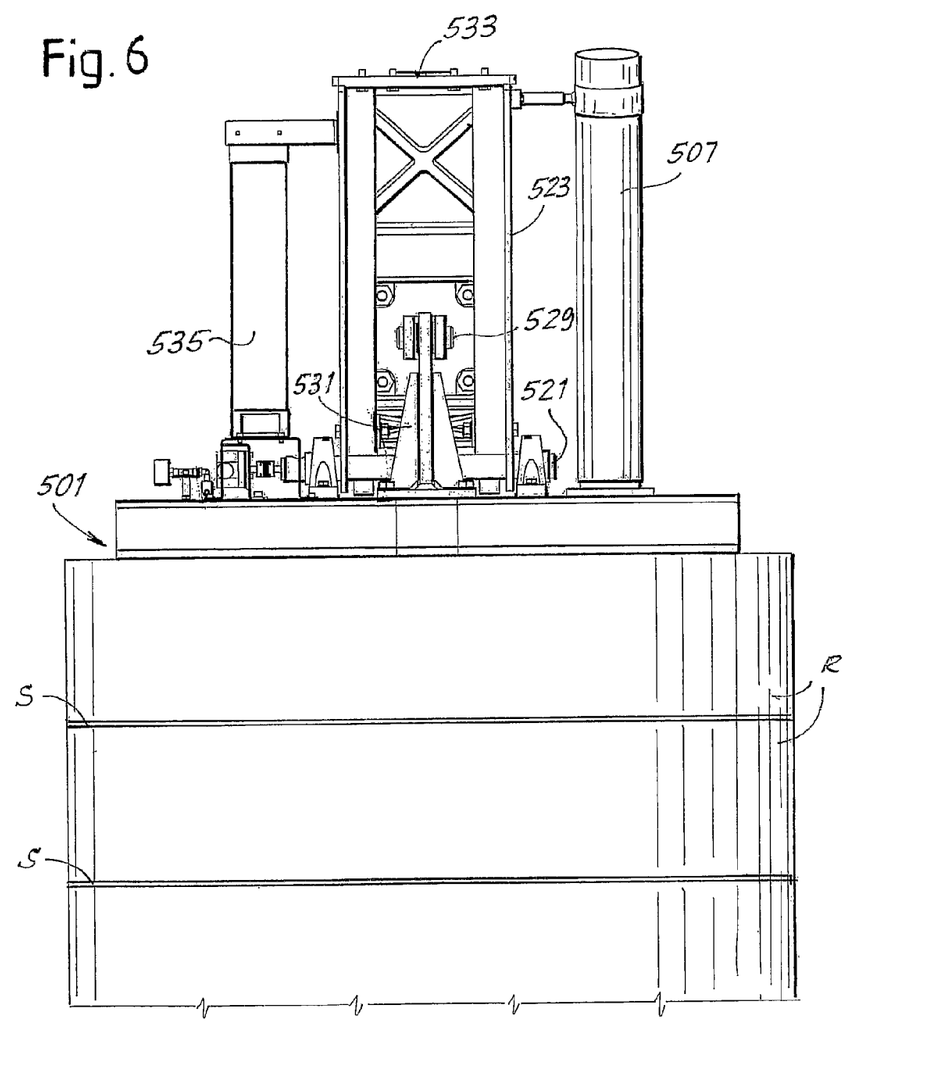
FIG. 6 shows a front view according to VI-VI in FIG. 2A.

The first embodiment of the head 61A of the robot 61 is illustrated in FIGS. 2A to 6, where FIGS. 2A and 2B show side views of the head with the gripping members represented in two different positions, more specifically a position to grip a roll with the axis A-A in a horizontal position (FIG. 2B) and a position to release the roll in the position with vertical axis (FIG. 2A). FIG. 3 is a plan view according to line III-III in FIG. 2A and FIG. 6 is a front view according to line VI-VI in FIG. 2A, while FIGS. 4 and 5 are axonometric views of the gripping members in the two positions indicated schematically in FIGS. 2A and 2B.

In an advantageous embodiment of the invention, the suction head 61A of robot 61 has a roll gripping surface, indicated with 501 and having an approximately flat semi-circular shape. More specifically, the surface 501 has a circular central area 501A and a semicircular extension 501B. According to a possible embodiment of the invention, the gripping surface 501 is divided (FIG. 4) into five suction areas 503A, 503B, 503C, while the circular central area has no suction, as it coincides with the axial hole of the rolls.

The suction area 503A has a substantially annular shape and is delimited by two concentric annular projections, defined inside which is a compartment which, by means of suction holes 505A, is placed in fluid connection with a flexible suction duct 507, in turn connected to a suction line. The numeral 505B indicates suction apertures associated with the two areas 503B developing in a portion of annular surface concentric to the central portion 501A. The numeral 505C indicates suction holes that connect the areas 503C to the suction line 507.

A slide valve operated by an actuator 507 (FIG. 5), for example of the electromagnetic type, is associated with the suction holes 505A, 505B and 505C. Operation is such to selectively open or close the suction holes 500A, 500B, 500C. In this way, it is possible to alternatively place only the holes 505A in fluid connection with the suction duct 507, keeping the holes 505B and 505C closed, or to also place the holes 505B and optionally also the holes 505C in connection with the duct 507. Opening or closing of the suction holes 505A, 505B, 505C takes place as a function of the diameter of the roll to be engaged. The larger the diameter of the roll is, the greater the number of annular or semi-annular areas 503A, 503B, 503C to be placed in connection with the suction line 507 will be. This guarantees maximum grip as a function of the diameter of the roll and minimum air consumption.

According to an advantageous embodiment a proximity sensor 511 and a strip 513 cooperating with an inductive sensor are associated with the surface to grip the rolls indicated with 501. The strip 513 is bent when the suction head and more precisely the gripping surface 501 comes into contact with the front surface of the roll to be engaged with the suction head. Deflection of the strip energizes the inductive sensor which enables suction. The proximity sensor 511 can be composed of a sonar to determine the distance from the roll.

The gripping surface 501 is mounted oscillating on an axle 521 supported by a frame 523. The numeral 525 indicates a piston-cylinder actuator, the rod 527 of which is hinged by means of an axle 529 to tabs 531 connected rigidly to the gripping surface 501. The piston-cylinder actuator 525 is supported on the frame 523 analogously to the oscillating axle 521 of the gripping surface 501. Constraint between the piston-cylinder actuator 525 and the frame 523 allows oscillation of the piston-cylinder actuator so that this takes the correct position (see FIGS. 2A, 2B) in each angular position of the gripping surface 501 with respect to the axle 521. The numeral 533 indicates a plate with which the frame 523 is fastened to the head end of the arm of the robot 61. Finally, the numeral 535 indicates a flexible channel for the wiring.

Figure 7:
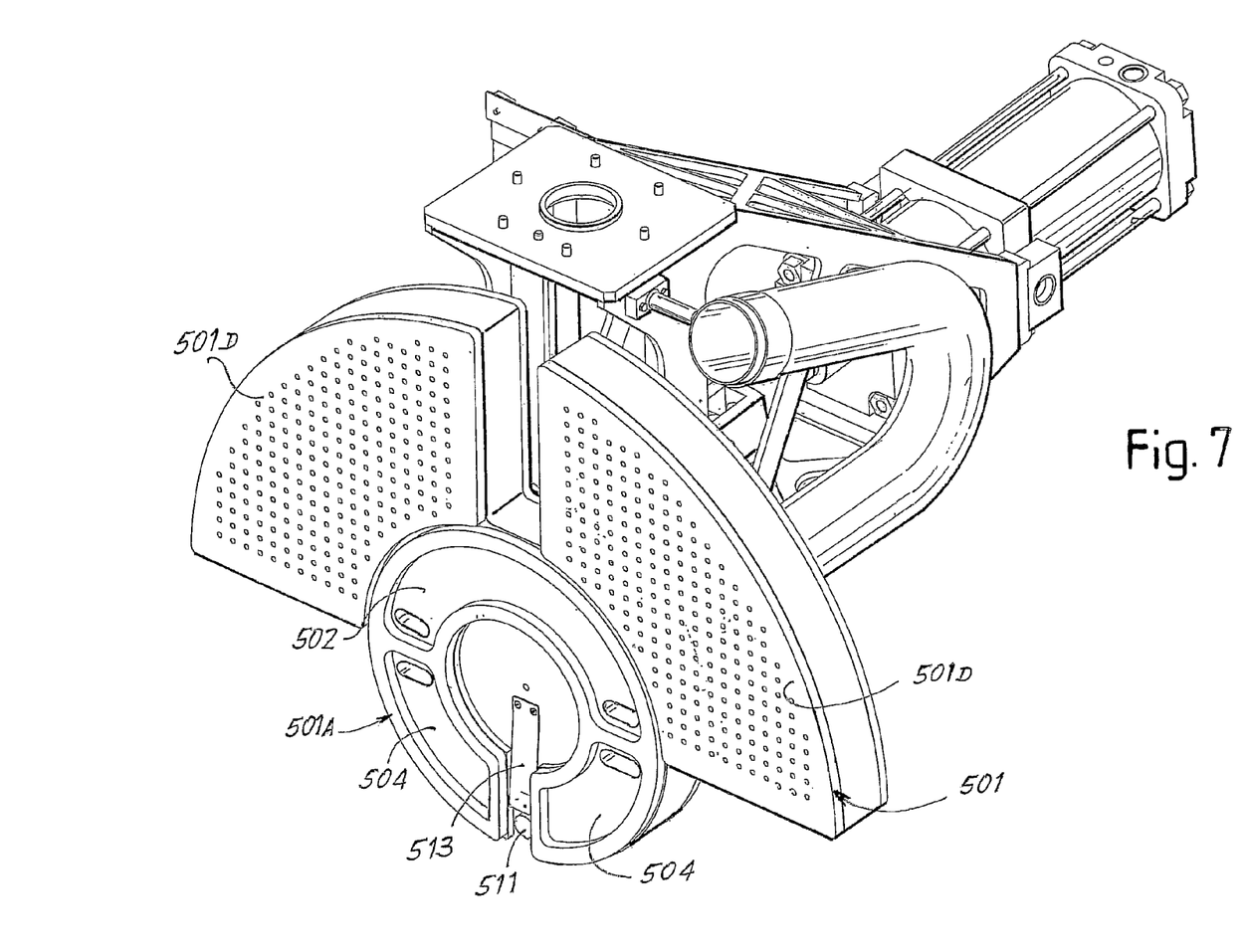
FIG. 7 shows an axonometric view of the head of the robot in a different embodiment.
Figure 8:
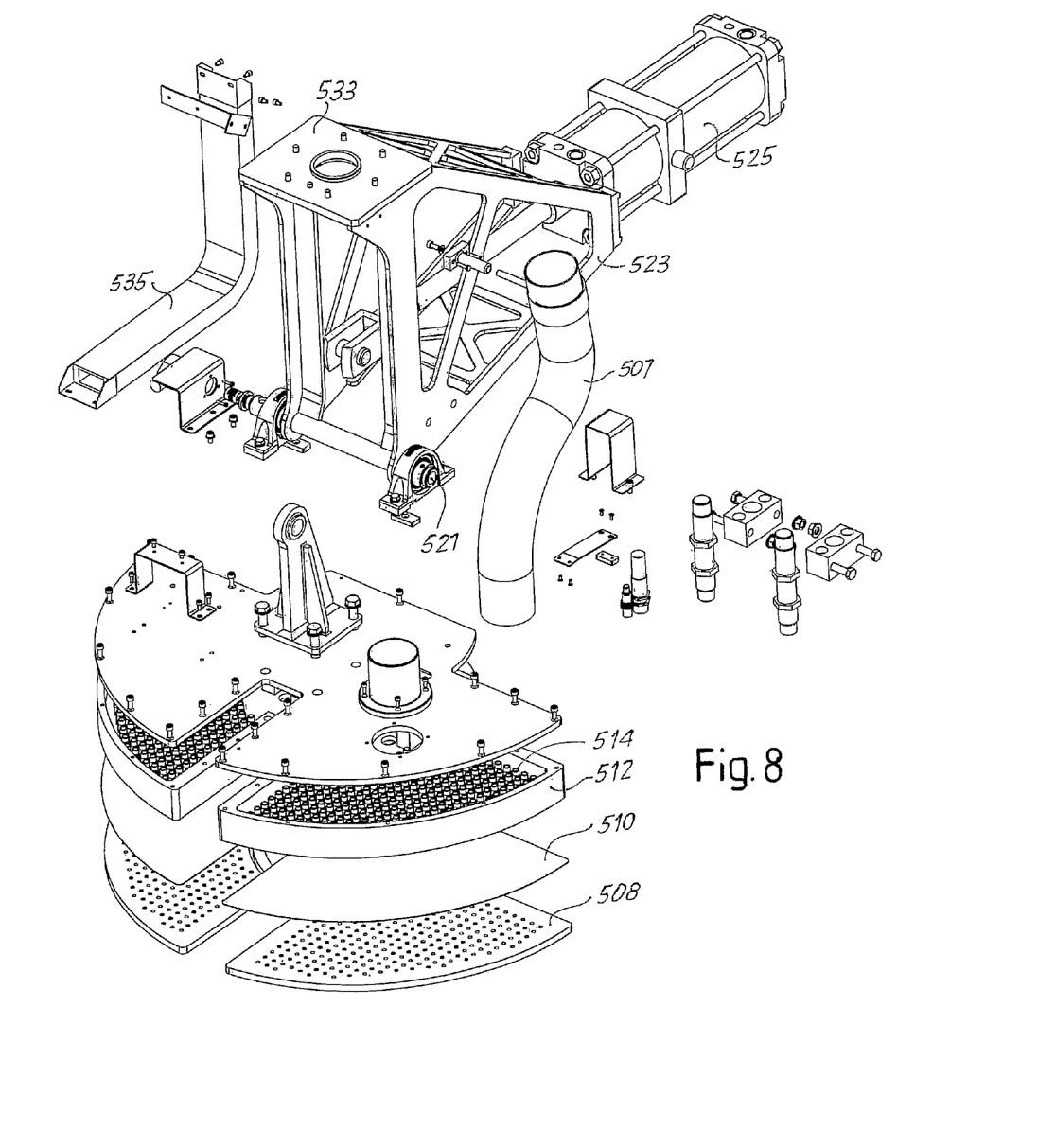
FIG. 8 shows an exploded view of the head in FIG. 7.

FIGS. 7 and 8 show a modified embodiment of the roll gripping members. The same numbers indicate the same or equivalent parts to those of the embodiment in FIGS. 2A to 6.

In this embodiment rather than the gripping surface 501 being characterized by annular or circular areas that can be selectively placed in communication with the suction line via a slide valve, a different configuration of the suction members is provided to allow automatic activation or deactivation of a smaller or larger suction surface. According to this embodiment, the suction gripping surface 601 has a central portion 501A with a substantially circular shape having a central area without suction, surrounded by suction areas 502 and 504 arranged concentrically about a central axle. Positioned about this central axle are two portions with annular sector 501D equipped with holes 506. As can be seen in the exploded view in FIG. 8, the holes 506 are produced in a plate 508, which defines the outer surface of the sectors 501D and behind which a filter 510 is placed. Placed behind the filter 501 is a frame 512, on which self-closing valves 514 are mounted, with number and position corresponding to the number and layout of the holes 506. These are valves which place the holes in connection with the suction area behind them, in fluid connection with the duct 507.

The self-closing valves 514 are configured so that they remain open while a limited flow rate of air passes therethrough. When the flow rate increases beyond a certain limit, the valve automatically closes. In this way, when the robot is operating and the front suction gripping surface 501 is brought into contact with the flat surface of a roll, this flat surface intercepts a certain number of holes 506 as well as the areas 502 and 504. These are always in fluid connection with the suction duct 507, once opening of a shut-off valve has been enabled by the sensor 513, while the holes 506 will be in fluid connection with the suction duct 507 only where the front surface of the roll to be engaged via the surface 501 is in front of the holes 506. The self-closing valves 514 which are at the level of holes 506 not closed by the front surface of the roll to be picked up close automatically due to the free flow of air through the holes 506. This solution allows the area through which suction is to be produced to be regulated automatically, without the use of valves with relative controlled actuators. It is also possible to produce a system in which the entire suction surface is produced with holes 506 and self-closing valves behind them.

Self-closing valves are known per se and do not therefore require to be described herein. For example, model ISV ⅛" valves produced by FESTO AG & Co KG. (Germany) can be utilized for this purpose.

FIGS. 9 to 12 show a further embodiment of the robot head 61. The same reference numbers are used to designate identical or equivalent parts to those shown in the previous embodiments. The head 61A is again a suction head with suction members designed and arranged to automatically activate suction in an area which is larger or smaller depending upon the diameter of the rolls to be handled.

Figure 9:
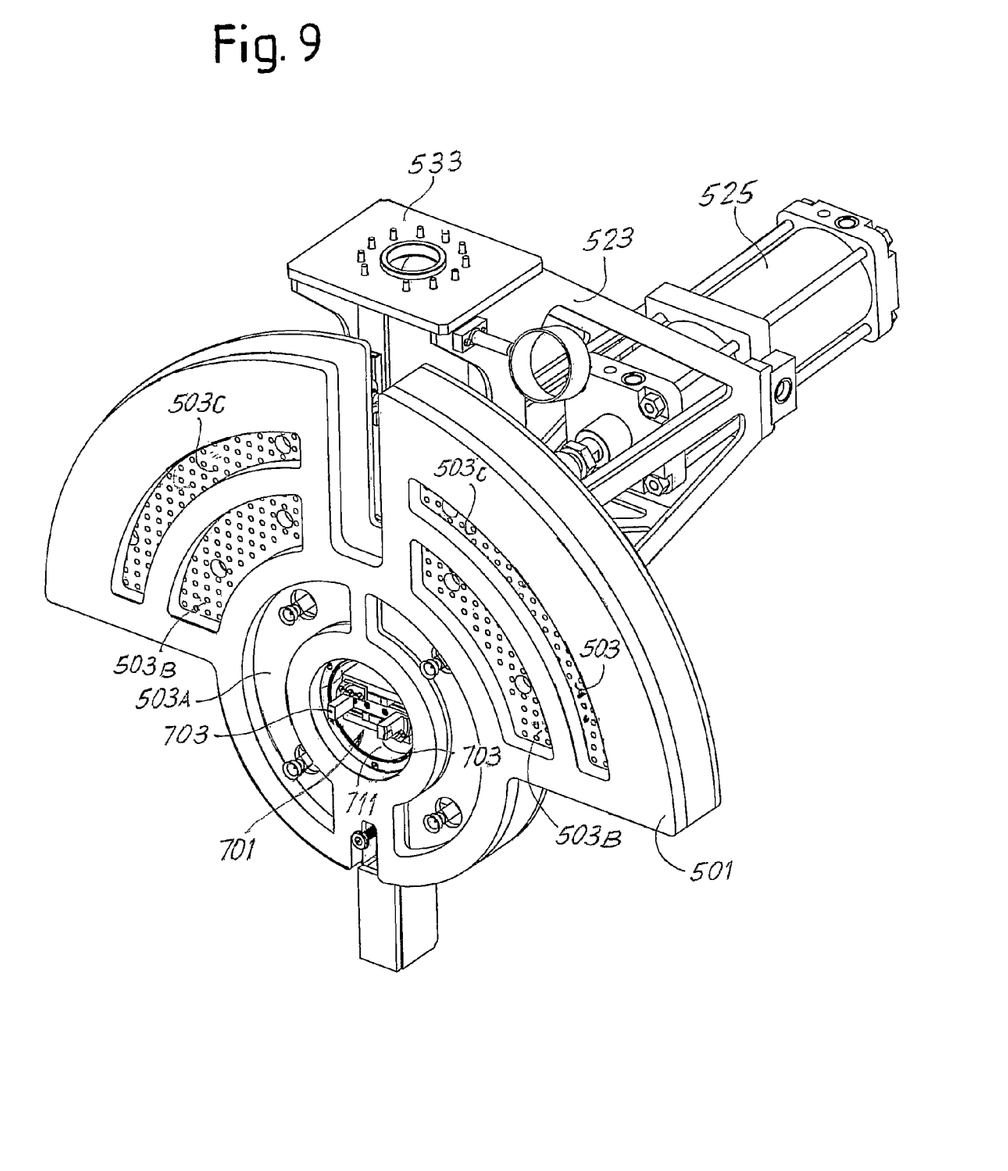
FIG. 9 shows an axonometric view of the head in still further embodiment.
Figure 10:
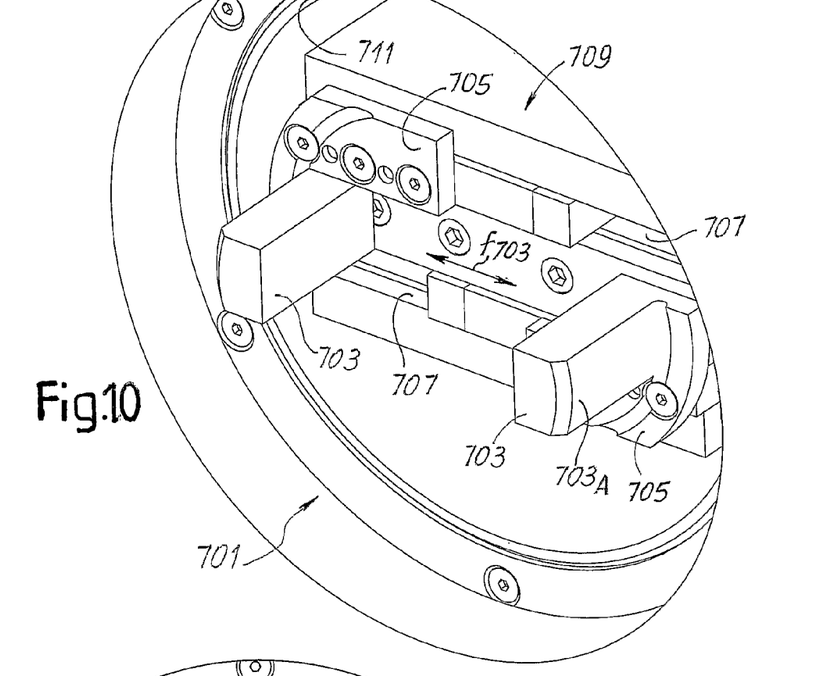
FIG. 10 shows an enlarged detail of FIG. 9, showing the gripping mechanism arranged on the head.
Figure 11:
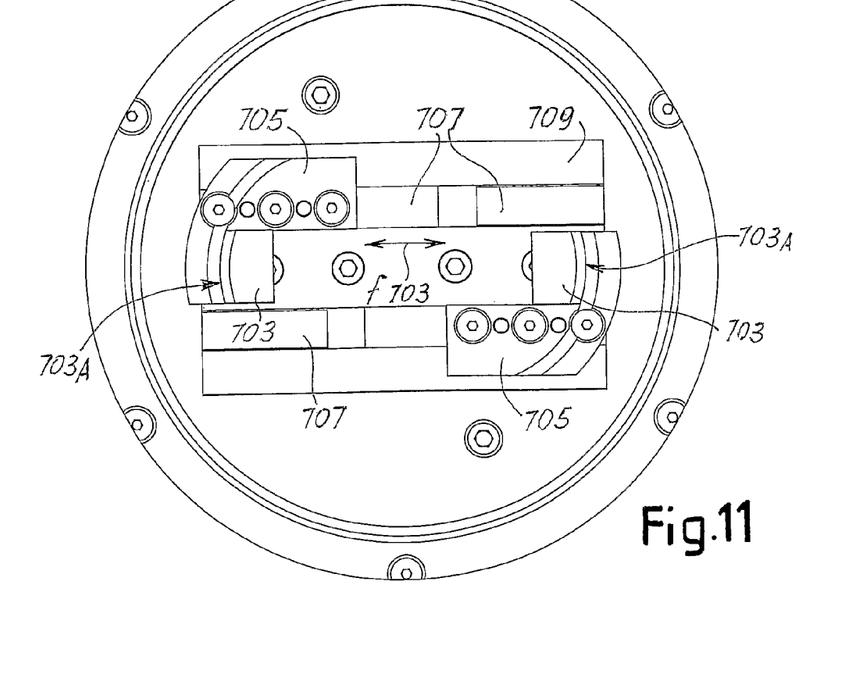
FIG. 11 shows a front view of the detail in FIG. 10.

In some cases, depending e.g. on the nature of the web material, the axial length of the rolls, their weight and other production parameters, the suction required to be applied by the head 61A can cause the second roll, i.e. roll adjacent the first one on which the head 61A acts to be sucked by the head. This causes two rolls to be picked up simultaneously. This is a problem if rolls are to be placed on the stack individually to separate them by separator sheets S. The embodiment in FIGS. 9-11 provides a suction head 61A which avoids or solves this problem.

In a central portion of the suction head 61A a mechanical gripper is provided, designated by 701 as a whole. The mechanical gripper 701 is comprised of a pair of jaws 703. The jaws 703 are supported by sliders 705 which are slidingly movable in guide channels 707 provided in a block 709. Actuators (not shown) are housed in block 709 to control the opening and closing movement according to arrow f703 of the jaws 703.

In one embodiment the jaws 703 have an outer curved gripping surface 703A, which is shaped to grip the winding core WC (FIG. 1A) on which each roll R is formed.

Figure 12:
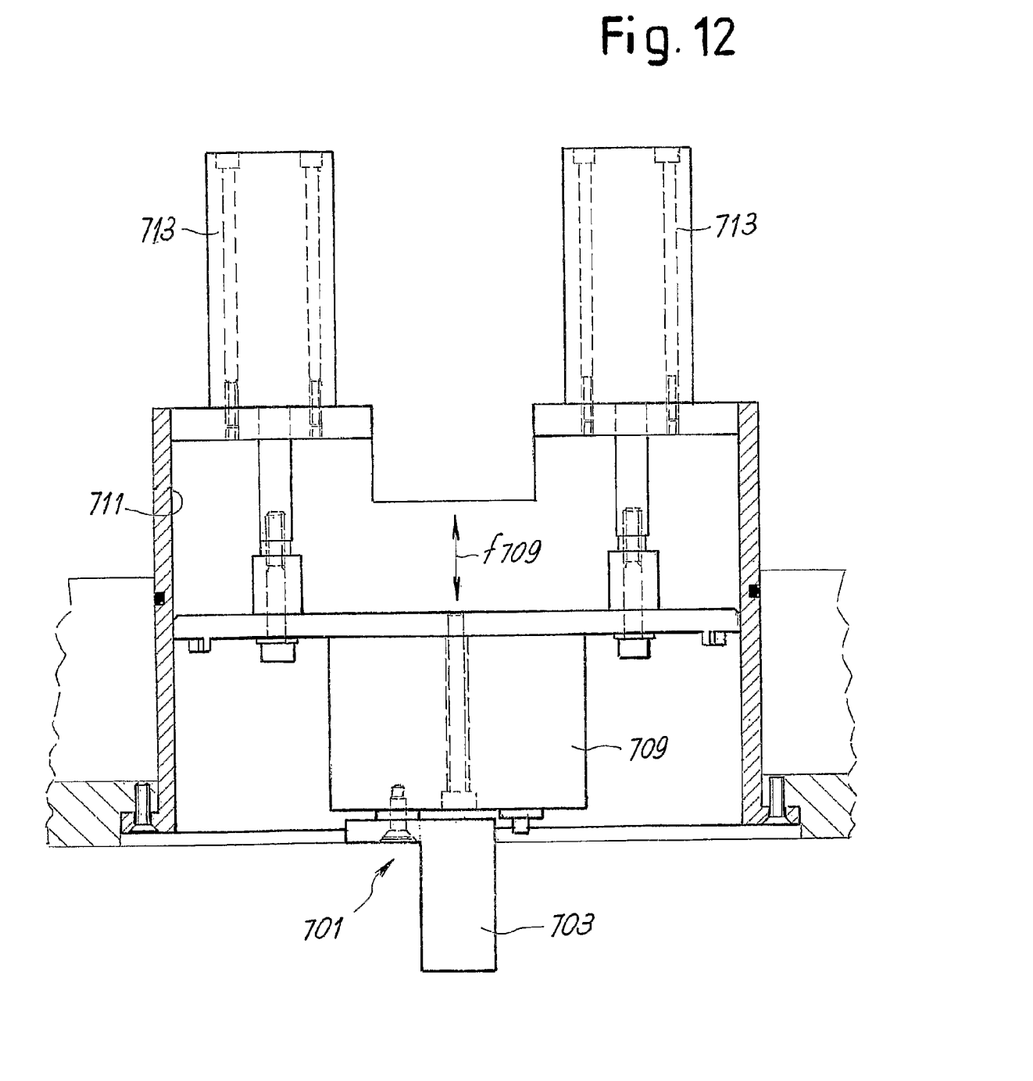
FIG. 12 shows a cross section of the gripping mechanism arranged on the head.

The block 709 is slidingly arranged in a tubular housing 711 arranged on the head 61A, behind the surface 501. The block 709 can be moved according to double arrow f709 (FIG. 12). In one embodiment, two cylinder-piston actuators 713 are provided for this purpose. The axial movement of block 709 according to arrow f709 is such that the jaws 703 can be brought in a projecting position, where they project from the surface 501, and in a retracted position, where they are housed in the tubular housing 711, without projecting from the surface 501.

The head 61A operates as follows. When the head 61A has to grip one roll R from a stack of rolls, e.g. from the cradle 37, 37 (FIG. 1A), the jaws 703 are placed in their extracted position. They are brought near to one another, such that by moving the head 61A towards the surface of the roll R the jaws 703 can enter the empty space inside the winding core Wc of the roll. Once the sensor provided on the head 61A indicate that the surface 501 has been brought in contact with the front surface of the roll R, the jaws 703 are opened, such that they grip with their outer cylindrical surfaces 703A the inner surface of the roll. The head 61A is then slightly moved away to separate the roll gripped by the jaws 703A from the next roll. At this point, vacuum can be activated. Since the roll engaged by the jaws 703 has been separated from the adjacent roll, the latter does not adhere to the gripped roll. Even a very small distance (e.g. 1 to few millimeters) can be sufficient to avoid mutual adhesion of the adjacent rolls.

If the head 61A has to grip a separator S, the jaws 703 are retracted inside the housing 711, so that they do not interfere with the operation of the head. The surface 501 can thus be brought in full contact with the separator sheet S.

It is understood that the drawing only shows examples provided by way of a practical illustration of the invention, which can vary in forms and arrangements without however departing from the scope of the concept underlying the invention. Any reference numerals in the appended claims are provided to facilitate reading of said claims with reference to the description and to the drawing, and do not limit the scope of protection represented by the claims.

The invention claimed is:

1. A robot for handling rolls of web material, comprising:
a suction head;
an articulated arm moving according to a plurality of numerically controlled axes and supporting said suction head, said suction head having a roll gripping surface, said roll gripping surface comprising a substantially flat and approximately semi-circular shape; and
a mechanical gripper for gripping a winding core of the rolls, said mechanical gripper being retractable in a position behind a suction surface of said head, said mechanical gripper including at least a pair of jaws and a block slidingly arranged in a housing placed behind a suction surface of said suction head, said block being movable in said housing to take up an extracted position and a retracted position, said block including guides along which said jaws are caused to slide, to grip and release the winding core.

2. A robot as claimed in claim 1, wherein said roll gripping surface includes a circular central area and a semicircular extension.

3. A robot as claimed in claim 2, wherein said suction head has suction areas operable selectively as a function of the diameter of the roll to be handled.

4. A robot as claimed in claim 3, wherein said suction head includes a plurality of self-closing valves, connected to a suction duct and positioned with a suction side towards the gripping surface of the suction head of the robot, said valves being equipped with respective shut-off members which close the valves when no surface of a roll to be engaged via said head is in front of said head.

5. A robot as claimed in claim 2, wherein said suction head includes a plurality of self-closing valves, connected to a suction duct and positioned with a suction side towards the gripping surface of the suction head of the robot, said valves being equipped with respective shut-off members which close the valves when no surface of a roll to be engaged via said head is in front of said suction head.

6. A robot as claimed in claim 2, wherein a sensor is associated with said suction head, said sensor activating suction when the head is in proximity to a roll.

7. A robot as claimed in claim 2, wherein said articulated arm is controlled to upend said rolls from a position in which an axis thereof is horizontal to a position in which the axis thereof is vertical.

8. A robot as claimed in claim 1, wherein said suction head has suction areas operable selectively as a function of the diameter of the roll to be handled.

9. A robot as claimed in claim 8, wherein said suction areas are formed by substantially semi-annular portions, in fluid connection with a suction duct, selection members being provided to selectively connect said substantially semi-annular portions to said suction duct.

10. A robot as claimed in claim 9, wherein said selection members comprise a valve.

11. A robot as claimed in claim 8, wherein said suction head includes a plurality of self-closing valves, connected to a suction duct and positioned with a suction side towards the gripping surface of the suction head of the robot, said valves being equipped with respective shut-off members which close the valves when no surface of a roll to be engaged via said head is in front of said head.

12. A robot as claimed in claim 9, wherein said suction areas are formed by substantially semi-annular portions, in fluid connection with a suction duct, selection members being provided to selectively connect said substantially semi-annular portions to said suction duct.

13. A robot as claimed in claim 12, wherein said selection members comprise a valve.

14. A robot as claimed in claim 1, wherein said suction head includes a plurality of self-closing valves, connected to a suction duct and positioned with a suction side towards the gripping surface of the suction head of the robot, said valves being equipped with respective shut-off members which close the valves when no surface of a roll to be engaged via said head is in front of said head.

15. A robot as claimed in claim 1, wherein a sensor is associated with said suction head, said sensor activating suction when the suction head is in proximity to a roll.

16. A robot as claimed in claim 1, wherein said articulated arm is controlled to upend said rolls from a position in which an axis thereof is horizontal to a position in which the axis thereof is vertical.

17. A robot as claimed in claim 1, wherein said jaws have curved surfaces designed and arranged to contact an inner surface of the winding cores.

18. A robot as claimed in claim 1, wherein actuators for opening and closing said jaws are arranged in said block.

* * * * *